United States Patent [19]

Wilson

[11] Patent Number: 4,566,512
[45] Date of Patent: Jan. 28, 1986

[54] ROUTER ATTACHMENT

[76] Inventor: Basil L. R. Wilson, 2860 Porter, Wichita, Kans. 67204

[21] Appl. No.: 710,029

[22] Filed: Mar. 11, 1985

[51] Int. Cl.⁴ ............................................... B25F 5/00
[52] U.S. Cl. ........................... 144/134 D; 144/136 C; 144/251 R; 409/181
[58] Field of Search .......... 144/134 R, 134 A, 134 D, 144/136 C, 371, 251 R; 409/181, 182

[56] References Cited

U.S. PATENT DOCUMENTS

| | | | |
|---|---|---|---|
| 1,415,048 | 5/1922 | Pangian | 409/181 |
| 3,162,221 | 12/1964 | Lacey | 144/134 D |
| 3,332,462 | 7/1967 | Williams | 144/251 R |
| 4,041,997 | 8/1977 | Selfe | 144/136 C |
| 4,197,887 | 4/1980 | Groves | 144/136 C |
| 4,252,162 | 2/1981 | Norlander | 144/134 D |
| 4,294,297 | 10/1981 | Kieffer | 409/182 |
| 4,504,178 | 3/1985 | Seidenfaden | 144/134 D |

Primary Examiner—W. D. Bray
Assistant Examiner—Jorji M. Griffin
Attorney, Agent, or Firm—Kokjer, Kircher, Bradley, Wharton, Bowman & Johnson

[57] ABSTRACT

An attachment for portable routers having a relatively long, rotary cutting tool for imparting decorative contours in relatively non-portable construction components such as staircase railings and the like. A massive block is mounted on a relatively thick base plate and the block, in turn, mounts a cantilevered bearing holder in spaced apart parallelism from the base plate. One end of the shaft of the cutting tool is rotatably mounted in the bearing and the other shaft end is coupled to the router chuck.

8 Claims, 4 Drawing Figures

ROUTER ATTACHMENT

This invention relates to woodworking tools, and more particularly to an attachment for a portable router to render the latter useful for cutting decorative molding edges on relative large wooden surfaces such as staircase railings and the like.

Finish construction work for homes and buildings often involves the cutting or shaping of decorative edges on cabinets, trim pieces and various functional and decorative items involved in the building. Frequently, such edges can best be applied after the item to be decorated is securely integrated into the construction. This usually means that the edges extend along a number of different directions and often involve combinations of straight and curvilinear surfaces. When such edges are relatively narrow in width, highly portable, manually manipulatable edge cutting tools are quite satisfactory for this purpose. These tools are commonly called routers and are used extensively for such finish work.

Certain decorative and functional members, however, have surfaces which are too large to permit in situ treatment with conventionally available routers of this type. For example, long wooden staircase railings and bannisters have surfaces which require cutting and dressing in order to make them appear attractive and to smooth the exterior for comfortable gripping by a user. Such items are also usually formed to present long, gracefully curved structures which accommodate stairways while augmenting the asthetic appearance of the building in which they are installed.

Because of the inability of conventionally available portable routers to accommodate the finish shaping of structures of this kind, such structures are largely preformed from extruded aluminum or some similar material suitable for the structural purposes, yet capable of being bent or shaped at the factory into the necessary configuration. Often such preformed items do not blend well with the decoration throughout the remainder of the building and tend to cheapen the overall look of the building finish.

Many building owners prefer railings and bannisters formed of wood for its intrinsic beauty and in an attempt to create an appearance similar to that found in buildings constructed in an earlier era employing a substantial amount of hand carved wooden decorations. The substantial cost of hand carving today has rendered carved structures substantially prohibitive and has effectively limited the use of wood for such purposes to those shapes which can be readily cut in factories.

Some wooden railings, bannisters and large moldings can be specifically formed by laminations and other procedures into the long and irregular forms required. It is not normally feasible to apply satisfactory decorative surfaces to such items with fixed equipment at a factory due to their lengths and the difficulty involved in manipulation of the forms through the finishing machines. Again, as a practical matter, many such structures can only be constructed at the installation site as an integral part of the building construction.

Conventional portable routers are virtually worthless for shaping the large surfaces involved on these structures due to the relatively small cutting bit which can be accommodated by the routers. The cutting bit projects in cantilevered fashion from one end of the router and the deflection to the bit from side loading results in too much vibration to permit the use of bits long enough to accommodate the large surfaces presented by such items as railings, bannisters and the like.

Attachments for conventional routers have heretofore been proposed in an effort to increase the uses to which such tools can be put. These have been, in the main, devices designed to facilitate the use of the router for traversing special configurations in the objection to be treated by the routing operation. Such devices are involved in U.S. Pat. Nos. 3,332,462; 4,197,887 , and 4,252,164. Others have proposed attachments, not for routers, but for converting portable electric drills so that they can be used in the general nature in which routers would be used to perform conventional router type operations. Examples of attachments for drills of this type are disclosed in U.S. Pat. Nos. 3,162,221 and 4,041,997.

The apparatus described in U.S. Pat. No. 4,041,997 is intended primarily for forming, cleaning out, or enlarging grooves in structures such as window frames having internal corners. The apparatus utilizes a C-shaped bit mounting wherein each end of the cutter bit is supported in a bearing. However, emphasis is placed on minimizing the size of the structure supporting the outer bearing to permit the tool to be used in right angle corners. The light construction necessitated by the minimal size of the bearing support may be adequate for the window corner cleaning and shaping operations contemplated by the patentee, but such construction and other tool guiding adjuncts would appear to render the tool unsuited for satisfactory portable finish shaping operations on the large surfaces presented by installed railings, bannisters and such.

Accordingly, it is a primary objective of this invention to provide an attachment for conventional routers so that a relatively long form cutting tool can be so stably mounted that the router can be successfully utilized for forming irregular configuration on the large surfaces of installed railings, moldings and the like.

Another object of the present invention is to provide an attachment for a router wherein the substantial forces eminating from the use of a blade long enough to extend across a major face of relatively large wooden railings, bannisters and moldings are resisted by massive attachment structural components, insuring against lateral deflection of the blade under such forces as would otherwise cause vibrations rendering the tool useless for finish forming operations in structures of this kind.

The invention is also intended to provide a versatile tool capable of accepting any number of custom ground forming tools that would be required for varied applications. The structure of the mounting is such that varying lengths of forming tools can be accepted with a simple change of the spacer block.

A yet further object of this invention is to provide an attachment for routers which incorporate a bit receiving aperture through the attachment base plate, which aperture is of dual size, stepped construction for enhanced rotary operation of the bit without materially detracting from the overall strength of the attachment.

Still another object of the invention is to provide a novel routing attachment for a conventional router involving a novel blade shaft of different transverse dimension longitudinally of the shaft so that the blade is able to withstand substantial lateral forces without deflection.

These and other important aims and objectives of the present invention will be further explained or will become apparent from the following explanation and description of the figures of the drawing, wherein.

Figure 1:
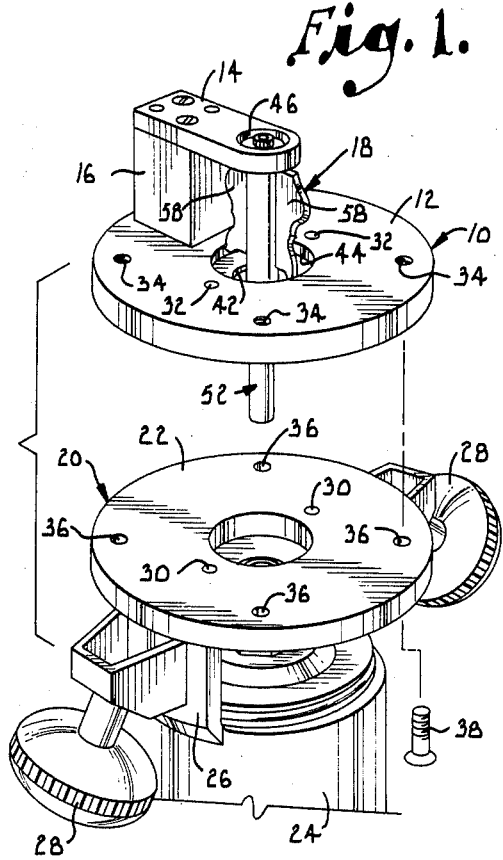
FIG. 1 is a partially exploded, fragmentary perspective view of the attachment embodying the principles of this invention and conventional router to which it may be attached.

The attachment of this invention is broadly designated by the reference numeral 10 and includes a circular base member 12, a bearing mounting element 14 and a spacer block 16 interposed between member 12 and element 14. A cutting tool 18 is mounted in element 14 and is adapted to be operably coupled with a conventional router broadly designated by the numeral 20.

Router 20 is of conventional construction, and includes a sole plate 22 having a flat surface, an electric motor 24 and a frame 26 coupling plate 22 to the motor. A pair of handles 28 project outwardly from frame 26 to permit two handed manual manipulation of the router during use.

Figure 2:
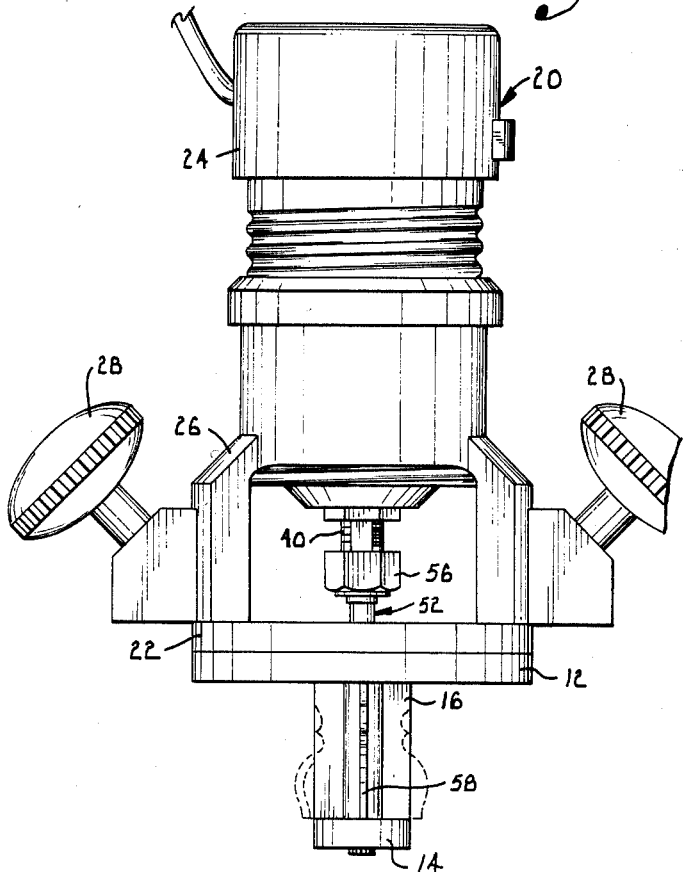
FIG. 2 is a front elevational view of a router and attachment.
Figure 3:
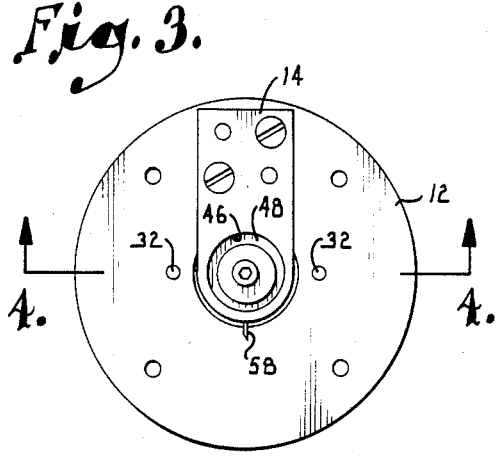
FIG. 3 is a bottom plan view of the attachment.

Member 12 is a substantially thick circular rigid disc constructed of metal and having a pair of opposed flat planar surfaces so that it may be releasably secured in flat closely abutting relationship to the flat surface of sole plate 20 as illustrated in FIG. 2 of the drawing. The sole plate is provided with a pair of spaced apart locater holes 30. Member 12 includes a pair of pins 32 rigidly secured thereto and projecting from the member in disposition to be inserted into holes 30 for maintaining the member in precise axially alignment with the sole plate against any sliding forces which may be imparted to the attachment during use.

A plurality of holes 34 spaced peripherally around the member are aligned with holes 36 in sole plate 22 for releasable attachment of member 12 to the sole plate by means of screws 38.

Element 14 is an elongated, relatively thick, rigid beam rigidly secured to one end of the massive, one piece, metal spacer block 16. The latter is of transversely rectangular configuration and has a pair of opposite end surfaces which are precisely parallel so that the block can be mounted on member 12 in the position as illustrated in the drawing. Thus, element 14 is held in precise, spaced apart parallelism with that surface of member 12 which opposite the surface engaged against the router sole plate 22. Element 14 is cantilevered from one end of block 16 and extends radially from the axis of router shaft 40. Block 16 also extends in a direction which is radial to the shaft and terminates substantially at the outer periphery of the circular member 12. Block 16 is of the same width as the width dimension of element 14 to minimize obstruction against the manual manipulation of the router and attachment during use. Block 16 may be of varying thickness to correspond to varying lengths of cutters.

Figure 4:
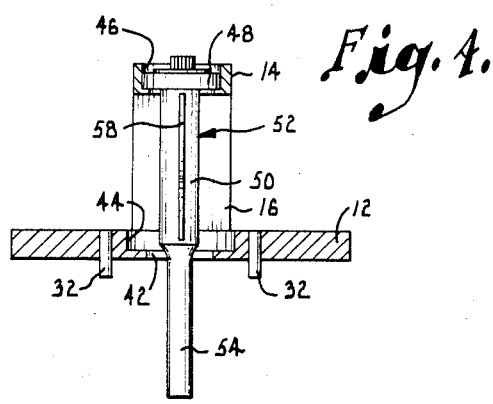
FIG. 4 is a detailed cross-sectional view taken along line 4—4 of FIG. 3.

Member 12 is provided with a two-stepped, centrally disposed aperture extending therethrough as illustrated best in FIGS. 1 and 4 of the drawing. The aperture comprises a first portion 42 of reduced diameter communicating with that surface of member 12 which abutts the proximal surface of sole plate 22. Aperture portion 42 extends only partially through the member and communicates with a second aperture portion 44 of greater diameter than the first portion and extending between the latter and the opposite surface of member 12.

Similarly, element 14 is provided with a recess 46 which receives a bearing 48 rotatably mounting one end of an elongated transversely circular shaft 50 comprising an integral portion of a rotatable cutting tool 52. Shaft 50 has a first portion 54 of reduced diameter adapted to be releasably coupled to the shaft 40 of router 20 by the router chuck means 56. The transverse cross-section of shaft 52 increases within the member central aperture so that the portion of the shaft projecting beyond the member in the direction away from the router is of substantially increased diameter.

Tool 52 has a plurality of elongated radially outwardly projecting cutting blades 58, each blade having an elongated irregular outer cutting edge configured to provide the decorative shape desired by the operator as will be readily understood by those skilled in the art. It should be pointed out that the blades 58 extend beyond the proximal flat surface of member 12 and well within the enlarged portion 44 of the member central aperture to insure that the cutting blades extend throughout the full distance between element 14 and member 12. This insures that no uncut ridge is permitted to remain between the blade and member 12 such as as would mar the decorative design on the treated article.

In operation, member 12 is secured in the position illustrated in FIG. 2 by the attaching screws 38. Shaft 52 is attached to the router shaft 40 by releasable coupling means in the form of chuck 56. The studs or pins 32 received in the router sole plate holes 30 stabilize the attachment against sliding movement and also provide means for quickly aligning the screw receiving holes during the attaching procedure.

The width of end element 14 is slightly less than the diameter of the large portion 44 of the member central aperture so that the end element does not interfere with the ability of the cutting tool to be brought into working engagement against relatively wide surfaces to be treated in the routing operation. Further, the length of element 14 is no greater than the radius of member 12 combined with the radius of the aperture enlarged portion 44. This also insures that the cutting blades are not impeded by the mounting components during operation.

The enlarged portion of cutting tool 52, together with the cantilevered mounting of bearing 48 stabilizing the outer end of the shaft 50, insures against lateral deflection of the cutting tool as would cause intolerable vibrations in the cutting tool during operation with resultant imperfections in the treated surface. The massive, unitary block 16 rigidifies the entire assembly and also insures against such vibrations which would lead to deviations in the rotary path of travel of the cutting tool during operation.

Having thus described the invention, I claim:

1. An attachment for a router having a flat sole plate, an electric motor secured to the sole plate and means for releasably coupling a cutting tool to the motor shaft, said attachment comprising:
   a rigid member having a pair of parallel flat surfaces, one of said surfaces being adapted to fit in close abutting relationship against the said router sole plate, there being an aperture extending through the member;
   an elongated, rigid end element;
   a massive block of rigid material having a pair of flat, parallel ends, said block having open end rigidly secured to the surface of the member opposite that adjacent the router sole plate, the end element being rigidly secured to the other end of the block in cantilevered disposition extending in spaced apart parallelism with the member and over said aperture, said element having an opening axially aligned with the aperture in the member;

bearing means in the element opening; and an elongated rotatable cutting tool including a rotatable shaft having one end mounted in said bearing means and projecting through the member aperture in position to be coupled with the router motor shaft by said coupling means, said tool including a plurality of cutting vanes rigidly secured to the tool shaft and projecting radially therefrom, whereby the massive block and element support the outer end of the tool against vibration during cutting operations with the attachment.

2. The invention of claim 1, wherein said block is disposed between the member aperture and the outer edge of the member.

3. The invention of claim 2, wherein said block is transversely rectangular, and wherein the width of said block is less than the diameter of said aperture at the surface of the member from which the block projects.

4. The invention of claim 3, wherein said element has a width corresponding to the width of said block, the member and the aperture being circular, with the length of the element being no greater than the combined radii of the member and the aperture, and wherein the element extends radially of the member with the outer end of the member terminating at least at the outer periphery of the member, whereby to minimize interference with manual manipulation of the attachment while insuring maximum possible stability for the cutting tool against lateral deflection thereof.

5. The invention of claim 1, wherein said aperture comprises a transversely circular bore having a pair of bore portions, one portion extending inwardly partially through the member from the surface of the member adapted to engage the router sole plate, the other portion of the member being concentric with and of increased diameter from the first portion, said other portion extending from said one bore portion the remainder of the distance through the member, the respective vanes of the cutting tool extending into said larger bore portion.

6. The invention of claim 5, wherein the shaft of said cutting tool is transversely circular, and wherein the diameter of said shaft extending between the bearing and the member aperture is of greater diameter than the diameter of the remainder of the shaft, whereby to increase the longitudinal stability of the shaft in the region of the cutting vanes.

7. The invention of claim 5, wherein the attachment includes a plurality of projections rigidly secured to the member and extending outwardly from the surface thereof adapted to engage the router sole plate, the latter having holes to receive the corresponding projections to maintain the attachment against sliding movement relative to the sole plate.

8. An attachment for a router having a relatively large diameter, circular sole plate provided with positioning holes therein, an electric motor secured to the sole plate and means for releasably coupling a cutting bit to the motor shaft, said attachment comprising:

a circular disc having a pair of parallel, flat surfaces, one of said surfaces being adapted to fit against said router sole plate in close fitting abutting relationship thereagainst, said disc being provided with a central circular aperture extending therethrough, said aperture having a first portion of reduced diameter communicating with the router abutting flat surface, and a second portion of greater diameter than said first portion and concentric therewith communicating with said first portion and with the opposite face of said disc;

a plurality of positioning studs carried by said disc and projecting from said router abutting flat surface, there being a stud for each sole plate hole respectively, the respective studs being aligned with corresponding alignment holes for holding the disc in concentric alignment with said router sole plate;

means for releasably securing the disc in said close fitting, concentrically aligned abutting relationship against the router sole plate;

an elongated, rigid end element having a circular opening adjacent one end thereof extending through the member;

a massive block of rigid material having a pair of parallel, opposite ends and a width dimension less than the radial distance between the periphery of said aperture second portion and the outer periphery of the disc;

means rigidly securing the block between the disc and the element with one end of the element disposed in flat, abutting relationship against said disc opposite surface and extending between the aperture second portion and the outer periphery of the disc;

means rigidly securing the element to the other end of the block in disposition extending parallel with said disc opposite surface and cantilevered from the block with the element opening disposed in spaced apart, axial alignment with the disc aperture;

bearing means positioned in the element opening; and an elongated rotatable cutting tool, said tool having an elongated shaft having one end mounted for rotation in said bearing means, the other end of the bit shaft extending through the disc aperture and adapted to be coupled by said coupling means with the shaft of said router for rotation thereby, and a plurality of elongated blades rigidly secured to the bit shaft and projecting radially therefrom, each blade having an outer cutting edge configured to provide an ornamental configuration to an object to be shaped with the attachment, each blade cutting edge partially extending into said second aperture portion of the disc to eliminate the possibility for ridges in the object between the plate and the blade cutting edge.

* * * * *